N. A. NEWTON.
Thill-Coupling.

No. 207,816.    Patented Sept. 10, 1878.

Witnesses:
F. W. Burnham
W. H. Babcock

Inventor:
Nelson A. Newton

UNITED STATES PATENT OFFICE.

NELSON A. NEWTON, OF KALAMAZOO, MICHIGAN.

IMPROVEMENT IN THILL-COUPLINGS.

Specification forming part of Letters Patent No. 207,816, dated September 10, 1878; application filed July 29, 1878.

*To all whom it may concern:*

Be it known that I, NELSON A. NEWTON, of the village of Kalamazoo, Kalamazoo county, in the State of Michigan, have invented certain new and useful Improvements in Carriage-Shaft Couplings; and I do hereby declare that the following is a full, clear, and exact description thereof, which will enable others skilled in the art to which it appertains to make and use the same, reference being had to the accompanying drawings, and to the letters and figures marked thereon, which form a part of this specification.

This invention relates to that class of thill-couplings which are provided with springs for preventing rattling and holding the attached end of the thill in its proper position.

The nature of said invention consists in the combination, with a clip and thill, of a slotted plate formed with said clip, a hook attached to the rear end of said thill, and a peculiarly-constructed spring, which presses against said hook, as hereinafter more particularly set forth.

Figure 1:
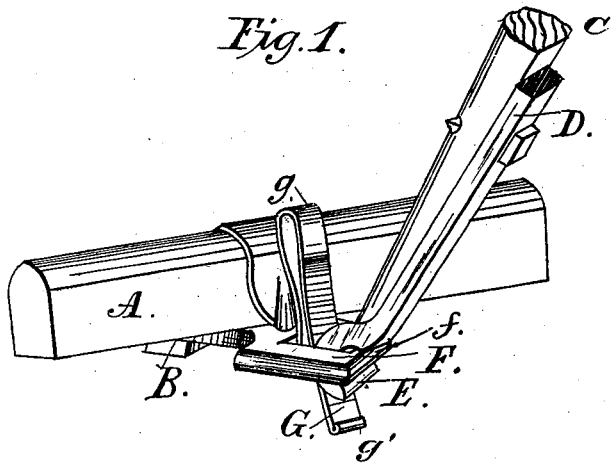
Figure 2:
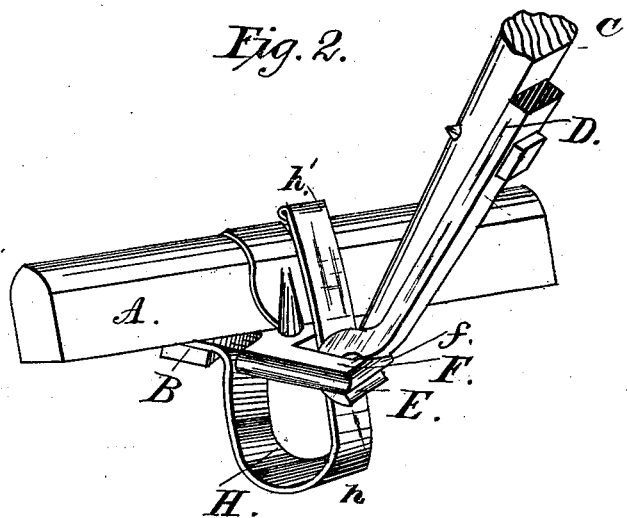

In said drawings, Figure 1 represents a perspective view of my improved thill-coupling; and Fig. 2 represents a perspective view of a modification of the same, showing a different form of spring.

A designates an axle, to which is attached a clip, B; and C designates the shaft or thill, to the rear end of which is attached a plate, D, ending in a downwardly-turned hook, E. Such hooks are not new, though they have heretofore generally been used for catching over bolts passing through the forwardly-extending lugs of the clip. The nuts holding these bolts are liable to become loosened by wear and jars, and the bolts themselves are then liable to be detached. Besides, the construction is unnecessarily expensive. To obviate these defects, I employ a slotted plate, F, which extends forward from the lower part of said clip, and the middle part of which is cut away, so as to leave a fixed front cross-bar, *f*, over which said hook catches. This simple device is not, however, broadly new. This combination would be constantly liable to severance but for the use of some additional device and the special adaptation of the parts, as hereinafter stated. For this purpose I employ a spring, G, which is attached to the lower side of said clip by one end, and passes up through the slot in plate F to a point, *g*, above the top of axle A, where it is again bent down through said slotted plate. Its pressure against said hook operates to hold it firmly in engagement with bar *f* of said slotted plate. Detachment and rattling are both thus prevented.

The parts are readily detached, when the ends of the thills are on the ground, by pressing backward spring G, so as to relieve the hook E therefrom. Said hook may then be taken from bar *g*, or it may be turned thereon, so as to allow the shaft to move up or down in a vertical plane, as when raised for hitching a horse, or when lowered to the ground. The upward extension of the spring is of importance, as giving it the requisite force. Its lower end, *g'*, is prolonged, to allow it to be readily pressed backward, so as to relieve the hook E from its pressure.

In Fig. 2 another form of spring, (marked H,) is shown as a modification. Said spring H is attached by its rear end to the under side of the clip B, at or near the rear thereof. It extends forward, and bends first downward and then upward, at *h*, passing through slotted plate F. Its upper end, *h'*, is extended sufficiently far upward to be readily grasped, whatever the position of the thills, which extension is necessarily above the top of the axle, at least.

The shape and size of hook E, bar *f*, and the adjacent parts are such that the thill can only be removed from the wagon when its front end or point is resting, or nearly resting, on the ground. This obviates all danger of accidental separation, even if the spring should not hold.

Having thus fully described my invention, what I claim as new, and desire to secure by Letters Patent, is—

1. In a thill-coupling, the combination, with a thill-hook and suitable attachment to a wagon, of a pressure-spring operating against said hook, and provided with an extension for conveniently releasing the same, substantially as described.

2. In a thill-coupling, the combination of a thill-hook and suitable attachment to a wagon with a pressure-spring operating against said hook, and provided with an extension for releasing the same, said spring being bent into the shape of a bow, substantially as described.

NELSON A. NEWTON.

Witnesses:
O. T. TUTHILL,
CHARLES COOPER.